July 4, 1967     I. M. WARD     3,329,048
TOOL CLAMPING DEVICE
Filed Nov. 30, 1964     2 Sheets-Sheet 1

Inventor:-
Ivan Malcolm Ward

By Watson, Cole, Grindle & Watson

Attorneys

July 4, 1967   I. M. WARD   3,329,048
TOOL CLAMPING DEVICE
Filed Nov. 30, 1964   2 Sheets-Sheet 2
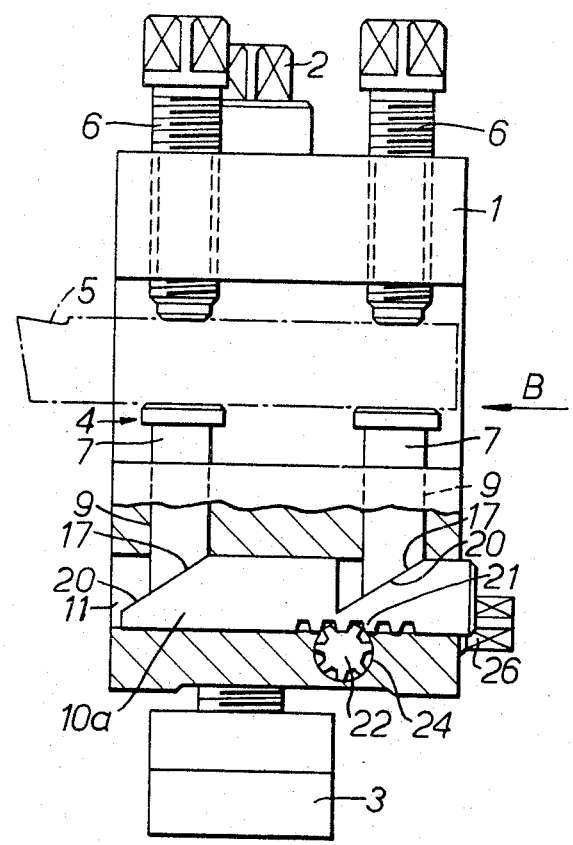
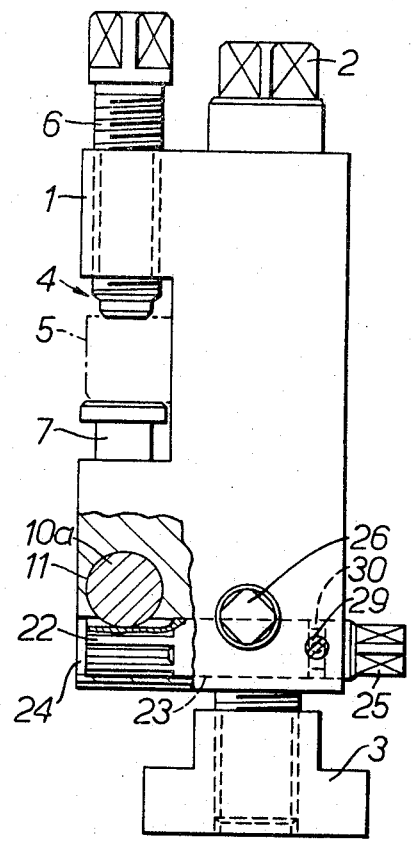
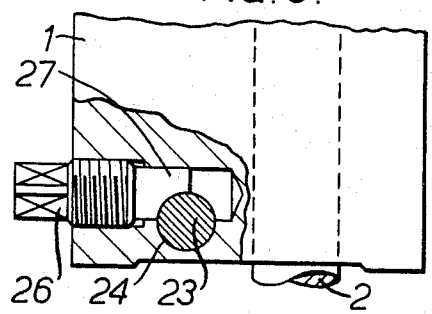
Inventor:-
Ivan Malcolm Ward
By Watson, Cole, Grindle & Watson
Attorneys United States Patent Office 3,329,048
Patented July 4, 1967

3,329,048
TOOL CLAMPING DEVICE
Ivan Malcolm Ward, Bulkington, near Nuneaton, England, assignor to Geo. H. Wilson (Shilton) Limited, Bedworth, Nuneaton, England, a British company
Filed Nov. 30, 1964, Ser. No. 414,761
Claims priority, application Great Britain, Nov. 29, 1963, 47,191/63
7 Claims. (Cl. 82—36)

The object of this invention is to provide an improved tool clamping device or tool post for firmly and accurately holding a tool such as a metal turning tool in a lathe or other machine tool.

It is well known with tool posts as commonly used where the tool shank is clamped in a recess in the tool post body by one or more clamping screws that recourse is usually had to packing the tool shank such as by pieces of broken saw blade with a view to obtaining the required setting. Not only is such procedure time wasting but is also prone to error resulting in poor machining and/or excessive tool wear or in some cases dislodgement of the tool during a machining operation with consequent damage to the machine, tool and workpiece.

A particular object of the present invention is to provide an improved clamping device or tool post of simple and robust construction whereby a tool can be readily set to the required position and firmly clamped to withstand heavy and prolonged working conditions.

In the accompanying drawings:

FIGURE 4 is a side elevation of a modified form of tool post embodying this invention, FIGURE 5 is an end elevation in the direction of the arrow B of FIGURE 4, and FIGURE 6 is a detail rear view partly in section.

Like parts are designated by the same or similar reference numerals throughout the drawings.

Figure 1:
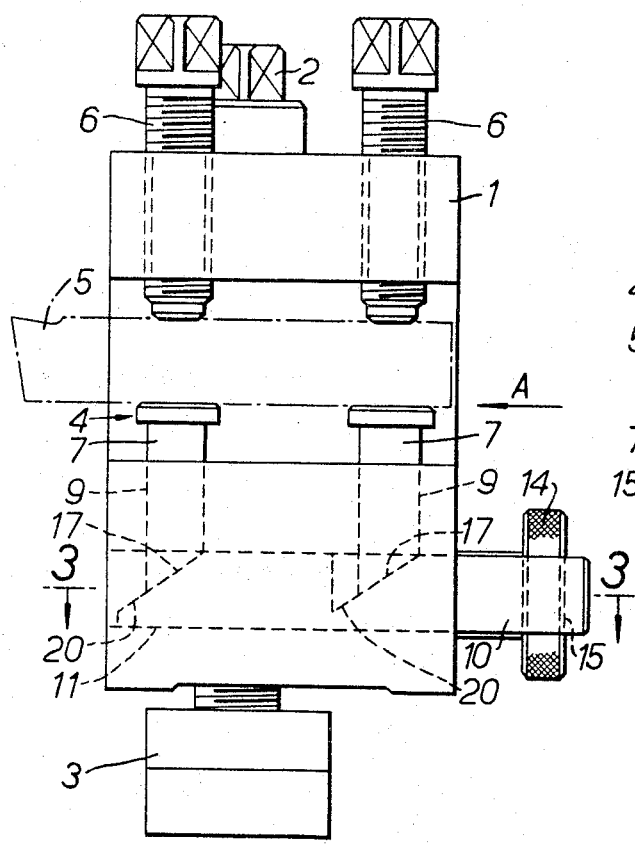
FIGURE 1 is a side elevation of one form of tool post embodying this invention.
Figure 2:
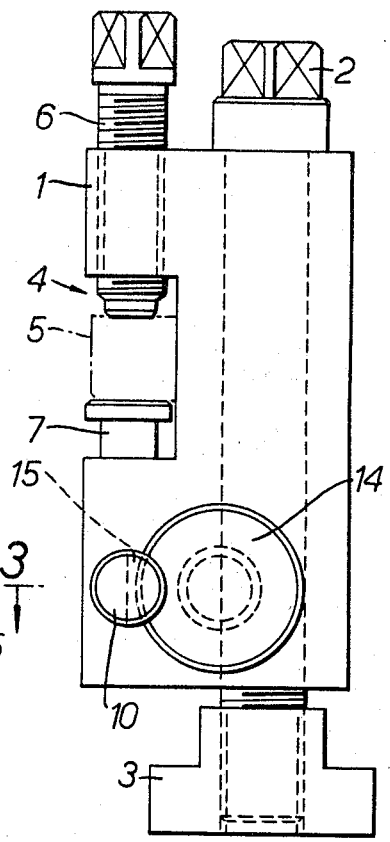
FIGURE 2 is an end elevation in the direction of the arrow A of FIGURE 1.
Figure 3:
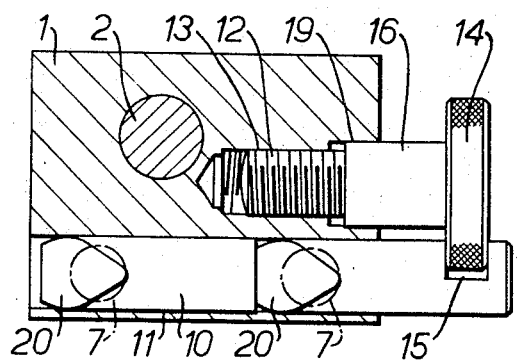
FIGURE 3 is a cross section taken on the line 3—3 of FIGURE 1.

Referring to FIGURES 1 to 3 of the drawings the tool post shown is of usual form in that it consists of a block 1 adapted to be bolted by the bolt 2 and T-nut 3 in position on a lathe slide or the like and is provided in one face with a transverse normally horizontally disposed recess 4 which receives the shank of a cutting tool indicated at 5 for clamping therein.

For applying clamping pressure to the tool 5, screw means is provided by a pair of screws 6 threaded in an upper part of the block 1 and arranged to act downwardly on the tool shank 5 in the usual manner.

In order to provide support for the tool 5 and abutment against the clamping pressure, the tool post includes in accordance with this invention one or more abutment or support elements 7 such as a pair thereof corresponding to the clamping screws 6 and opposed to the latter.

The elements 7 are shown consisting of pins slidable vertically in corresponding bores 9 provided in a lower part of the tool post block 1 whilst the pins 7 are shown arranged to be operated together for simultaneous and corresponding fine adjustment in a self locking manner.

For providing such adjustment in a simple manner a screw operated transverse actuating pin 10 is carried for axial movement in the lower part of the block 1 and substantially at right angles to the abutment or support pins 7, the said actuating pin 10 having an inclined face co-action with the support pins 7 whereby the latter may be raised or lowered by corresponding axial movement of the actuating pin 10.

Thus the lower end of each support pin 7 is provided with an inclined face 17 (e.g. at 45 degrees or thereabouts) which cooperates with a corresponding inclined surface 20 on the actuating pin.

For operating purposes the actuating pin 10 extends from the block 1 at one end whilst the other end of said pin 10 is provided with one of the inclined faces 20 for operating a corresponding support pin 7, an intermediate portion of the actuating pin 10 being cut away to provide the other inclined surface 20 for similar actuation of the other support pin 7.

In a convenient manner of providing simple and compact self-locking operation of the actuating pin 10, a screw 12 is threaded in the lower part of the block 1 in a bore 13 parallel to the bore or slideway 11 for the actuating pin. The outer end of the screw 12 is provided with a head such as a knurled head 14 arranged to engage a slot 15 in the adjacent outer end of the actuating pin 10 so that as the head 14 is turned the actuating pin 10 moves axially with and alongside the operating screw 12 whilst at the same time, and so long as the operating screw 12 is not turned, the actuating pin 10 is positively locked against axial movement.

A plain cylindrical portion 16 of the screw 12 is shown working in a corresponding counterbore 19 of the threaded bore 13 whereby the threaded engagement is wholly contained within the block 1 and thus protected from dirt or swarf.

It will therefore be appreciated that owing to the co-action of the inclined faces 17, 20, and by simply turning the operating screw 12 the support pins 7 can be raised or lowered for obtaining fine setting or adjustment of a tool shank 5 resting on them. Once adjustment has readily been obtained in this way clamping pressure is applied by tightening down the clamping screws 6 in the usual way and despite considerable pressure applied in this way, yielding of the support pins 7 does not take place owing to the self-locking action of the adjusting mechanism more particularly the actuating pin 10 and operating screw 12.

Whereas the actuating pin 10 is shown as being of round section working in a corresponding bore 11 and operating support pins 7 of similar form, if desired pins 7, 10 and bores 9, 11 of other suitable section may be employed. Thus the actuating pin 10 may be of square or rectangular section operating in a corresponding guideway in the block 1 such as a slot closed by a retaining plate.

In addition to the ease and quickness of operation of the tool post its dimensions may remain substantially the same as those of a normal post whilst the operating screw 12 is conveniently situated when the tool post is mounted in position of use.

In an alternative embodiment of the invention shown in FIGURES 4 to 6 the general construction of the tool post is similar to that already described with reference to FIGURES 1 to 3 except that an operating screw for the actuating pin is not employed.

Instead the actuating pin 10a is provided with transverse rack teeth 21 e.g. at its underside as shown for co-operation with a pinion or pinion portion 22 of a transverse spindle 23 carried in a corresponding bore 24 in the lower part of the block 1 whereby the spindle 23 extends to the back or that side of the tool post opposite to that face of the block 1 having the tool receiving recess 4.

The rear end of the spindle 23 is shown provided with a squared end 25 for operation by a spanner but it may be arranged for rotary operation in any suitable way such as by a key or screw driver in which latter event it need not necessarily protrude from the back of the tool post.

Having regard to the usual mounting bolt 2 extending vertically through the post the said spindle 23 is offset towards one end of the block 1 in order to clear the mounting bolt bore for which purpose the rack teeth 21 are provided on the actuating pin 10a at a corresponding portion of the latter. Apart from said rack tooth portion 21 the remainder of the actuating pin 10a is formed for sliding support in the tool post so as to relieve the rack and pinion engagement 21, 22 of load or pressure when a tool 5 is clamped in the post.

If desired the rack teeth 21 may be provided in a side of a longitudinal recess or slot in the rear side of the actuating pin 10a which slot receives the pinion end 22 of the said spindle 23. By such an arrangement the actuating pin 10a can be fully supported throughout its underside in the tool post.

For locking the actuating mechanism and the support elements or pins 7 in an adjusted position, locking means is provided which is shown consisting of a locking screw 26 carried by the lower part of the tool post block 1 and acting transversely against the spindle 23 for frictionally locking the latter e.g. by means of a suitable pad 27 arranged to bear against the side of the spindle 23 in pad bolt fashion, the screw 26 abutting the pad 27.

The spindle 23 is shown retained against axial movement by a set screw 29 in the block 1 engaging an annular groove 30 in the spindle 23.

In a development for obtaining a positive self-locking action a further pinion or pinion portion of the spindle 23 at or near the rear of the latter and which may be a continuation of the rack engaging pinion portion 22 may be arranged for operation by a worm operable for rotary movement from the exterior of the tool post in any convenient manner such as by a key, knob, head, or the like.

By employing operating mechanism in accordance with this alternative arrangement of post, projection of operating mechanism from the tool post can be kept to a minimum or even avoided and can be conveniently disposed for operation when the tool post is in position of use in a machine.

Although the forms of tool post have been herein described as used in the normal upright position, it is to be understood that they are capable of use in any other position if necessary and with the same advantages. Furthermore and although they have been described as applied to a single-way post, the invention is also capable of repeated embodiment in a multi-way post such as a four-way post for setting corresponding tools held in the latter.

I claim:
1. A tool clamping device comprising a mounting body having a transverse recess therein for receiving a tool, a plurality of abutment pins axially slidable in said clamping device one end of each of said pins extending into said recess for contact with a tool and the opposite end having an inclined face, clamping means in said mounting body for clamping a tool between itself and said abutment pins, an actuating pin axially slidable in said body transverse to said abutment pins, said actuating pin having a plurality of inclined faces which cooperate with the inclined faces of said abutment pins for effecting axial adjustment of said pins, at least one notch disposed in one side of said actuating pin substantially transverse to the axis of said pin, a bearing member registering in said slot disposed on an axis spaced from said actuating pin, said bearing member being capable of axially moving said actuating pin whereby said abutment pins may be axially adjusted.

2. A tool clamping device as claimed in claim 1 wherein said bearing member is rotatable.

3. A tool clamping device as claimed in claim 1 wherein said axis of said bearing member is substantially parallel to the axis of said actuating pin.

4. A tool clamping device as claimed in claim 1 wherein the axis of said bearing member is substantially transverse to the axis of said actuating pin.

5. A tool clamping device as claimed in claim 3 wherein said bearing member comprises the head of a screw, the threaded portion of which is rotatable in a corresponding threaded hole in said mounting body, whereby rotation of said screw causes said actuating pin to move axially.

6. A tool clamping device as claimed in claim 4 wherein said notches comprise a rack and said bearing member comprises a rotatable pinion engaging said rack, whereby rotation of said pinion causes said actuating pin to move axially.

7. A tool clamping device as claimed in claim 2 wherein releasable means is provided for locking said bearing member against rotation.

References Cited
UNITED STATES PATENTS

| | | | |
|---|---|---|---|
| 2,188,917 | 2/1940 | Poorman | 82—36 |
| 2,624,103 | 1/1953 | Bader | 29—96 |
| 2,660,242 | 10/1953 | Lane | 29—105 X |
| 3,143,906 | 8/1964 | Smith | 82—37 |

WILLIAM W. DYER, JR., Primary Examiner.

LEONIDAS VLACHOS, Examiner.